United States Patent
Hagimori

[11] Patent Number: 5,956,186
[45] Date of Patent: Sep. 21, 1999

[54] ZOOM LENS SYSTEM

[75] Inventor: Hitoshi Hagimori, Nara-ken, Japan

[73] Assignee: Minolta Co., Ltd., Osaka, Japan

[21] Appl. No.: 08/852,180

[22] Filed: May 6, 1997

Related U.S. Application Data

[62] Division of application No. 08/498,259, Jul. 3, 1995, Pat. No. 5,659,428.

[30] Foreign Application Priority Data

Jul. 6, 1994 [JP] Japan .................................. 6-154591

[51] Int. Cl.⁶ .................................................... G02B 15/14
[52] U.S. Cl. ........................... 359/692; 359/684; 359/686
[58] Field of Search .................... 359/686, 691, 359/692, 683, 693, 684

[56] References Cited

U.S. PATENT DOCUMENTS

| | | | |
|---|---|---|---|
| 4,266,860 | 5/1981 | Hayashi | 359/683 |
| 4,576,444 | 3/1986 | Kawamura | 359/693 |
| 4,936,661 | 6/1990 | Betensky et al. | 359/692 |
| 4,991,945 | 2/1991 | Estelle | 359/692 |
| 5,042,926 | 8/1991 | Kikuchi | 359/684 |
| 5,054,897 | 10/1991 | Ozawa | 359/691 |
| 5,329,402 | 7/1994 | Sato | 359/683 |
| 5,418,648 | 5/1995 | Ono | 359/683 |

FOREIGN PATENT DOCUMENTS

| | | |
|---|---|---|
| 56119109 | 9/1981 | Japan . |
| 5119256 | 5/1993 | Japan . |
| 5323192 | 12/1993 | Japan . |

*Primary Examiner*—Scott J. Sugarman
*Attorney, Agent, or Firm*—Price,Gess & Ubell

[57] ABSTRACT

A zoom lens system includes a positive lens unit and a negative lens unit. Focusing in a focal length range from a shortest focal length condition to a middle focal length condition is performed by moving the positive lens unit, and focusing in a focal length range from the middle focal length condition to a longest focal length condition is performed by moving the negative lens unit. The zoom lens system fulfills the following condition:

$$0.08 < \frac{B_f}{\Delta t} < 3$$

where $B_f$ is a distance from a rear end surface of the zoom lens system to a film at the shortest focal length condition and $\Delta t$ is a diagonal length of the film.

4 Claims, 12 Drawing Sheets

FIG. 5A
FNO=3.61

-1.0  1.0
SPHERICAL  SINE
ABERRATION CONDITION

FIG. 5B
Y'=21.63

-1.0  1.0
ASTIGMATISM

FIG. 5C
Y'=21.63

-10.0  10.0
DISTORTION %

FIG. 5D
FNO=5.07

-1.0  1.0
SPHERICAL  SINE
ABERRATION CONDITION

FIG. 5E
Y'=21.63

-1.0  1.0
ASTIGMATISM

FIG. 5F
Y'=21.63

-10.0  10.0
DISTORTION %

FIG. 5G
FNO=9.42

-1.0  1.0
SPHERICAL  SINE
ABERRATION CONDITION

FIG. 5H
Y'=21.63

-1.0  1.0
ASTIGMATISM

FIG. 5I
Y'=21.63

-10.0  10.0
DISTORTION %

FIG. 7A
FNO=4.60
— d
— — g
- - - - SC

-2.0   2.0
SPHERICAL   SINE
ABERRATION CONDITION

FIG. 7B
Y'=21.63
- - - - DM
——— DS

-1.0   1.0
ASTIGMATISM

FIG. 7C
Y'=21.63

-10.0   10.0
DISTORTION %

FIG. 7D
FNO=5.80
— d
— — g
- - - - SC

-2.0   2.0
SPHERICAL   SINE
ABERRATION CONDITION

FIG. 7E
Y'=21.63
- - - - DM
——— DS

-1.0   1.0
ASTIGMATISM

FIG. 7F
Y'=21.63

-10.0   10.0
DISTORTION %

FIG. 7G
FNO=6.90
— d
— — g
- - - - SC

-2.0   2.0
SPHERICAL   SINE
ABERRATION CONDITION

FIG. 7H
Y'=21.63
- - - - DM
——— DS

-1.0   1.0
ASTIGMATISM

FIG. 7I
Y'=21.63

-10.0   10.0
DISTORTION %

FIG. 8A
EFFECTIVE FNO=4.60

-2.0  2.0
SPHERICAL SINE
ABERRATION CONDITION

-1.0  1.0
ASTIGMATISM

-10.0  10.0
DISTORTION %

FIG. 8D
EFFECTIVE FNO=5.90

-2.0  2.0
SPHERICAL SINE
ABERRATION CONDITION

-1.0  1.0
ASTIGMATISM

-10.0  10.0
DISTORTION %

FIG. 8G
EFFECTIVE FNO=7.39

-2.0  2.0
SPHERICAL SINE
ABERRATION CONDITION

-1.0  1.0
ASTIGMATISM

-10.0  10.0
DISTORTION %

FIG. 9A
FNO=4.10
— d
— — g
- - - - SC

-1.0  1.0
SPHERICAL   SINE
ABERRATION CONDITION

FIG. 9B
Y'=22.70
- - - - DM
— DS

-1.0  1.0
ASTIGMATISM

FIG. 9C
Y'=22.70

-10.0  10.0
DISTORTION %

FIG. 9D
FNO=4.80
— d
— — g
- - - - SC

-1.0  1.0
SPHERICAL   SINE
ABERRATION CONDITION

FIG. 9E
Y'=22.70
- - - - DM
— DS

-1.0  1.0
ASTIGMATISM

FIG. 9F
Y'=22.70

-10.0  10.0
DISTORTION %

FIG. 9G
FNO=5.80
— d
— — g
- - - - SC

-1.0  1.0
SPHERICAL   SINE
ABERRATION CONDITION

FIG. 9H
Y'=22.70
- - - - DM
— DS

-1.0  1.0
ASTIGMATISM

FIG. 9I
Y'=22.70

-10.0  10.0
DISTORTION %

FIG. 10A
EFFECTIVE FNO=4.21

SPHERICAL SINE
ABERRATION CONDITION

FIG. 10B
Y'=22.70

ASTIGMATISM

FIG. 10C
Y'=22.70

DISTORTION %

FIG. 10D
EFFECTIVE FNO=4.78

SPHERICAL SINE
ABERRATION CONDITION

FIG. 10E
Y'=22.70

ASTIGMATISM

FIG. 10F
Y'=22.70

DISTORTION %

FIG. 10G
EFFECTIVE FNO=5.85

SPHERICAL SINE
ABERRATION CONDITION

FIG. 10H
Y'=22.70

ASTIGMATISM

FIG. 10I
Y'=22.70

DISTORTION %

FIG. 11A
FNO=3.62

FIG. 11D
FNO=5.95

FIG. 11G
FNO=8.13

FIG. 12A
EFFECTIVE FNO=3.71

—— d
— — g
- - - - SC

-1.0   1.0
SPHERICAL   SINE
ABERRATION CONDITION

-1.0   1.0
ASTIGMATISM

FIG. 12C
Y'=21.63

-10.0   10.0
DISTORTION %

FIG. 12D
EFFECTIVE FNO=5.82

—— d
— — g
- - - - SC

-1.0   1.0
SPHERICAL   SINE
ABERRATION CONDITION

-1.0   1.0
ASTIGMATISM

FIG. 12F
Y'=21.63

-10.0   10.0
DISTORTION %

FIG. 12G
EFFECTIVE FNO=8.00

—— d
— — g
- - - - SC

-1.0   1.0
SPHERICAL   SINE
ABERRATION CONDITION

-1.0   1.0
ASTIGMATISM

FIG. 12I
Y'=21.63

-10.0   10.0
DISTORTION %

ZOOM LENS SYSTEM

This is a division of prior application Ser. No. 08/498,259, filed on Jul. 3, 1995, for a ZOOM LENS SYSTEM now U.S. Pat. No. 5,659,428.

BACKGROUND OF THE INVENTION

1. Field of the Invention

The present invention relates to a zoom lens system, and more particularly, to a zoom lens system with an improved focusing method.

2. Description of the Prior Art

In a typical conventional zoom lens system, the same lens unit is used to perform focusing in the entire focal length range of zooming. However, usually, different lens units are the most suitable for moving for focusing in different focal length ranges. Therefore, to enable a closer photography while maintaining more excellent close photography performance, it is desirable to use, for focusing, different lens units in different focal length ranges.

In view of this, U.S. Pat. No. 5,042,926 discloses a three unit zoom lens system of negative, positive, negative configuration where the second lens unit is used to perform focusing in a focal length range (30 mm to 36 mm) from the shortest to the middle focal length conditions and the first lens unit is used to perform focusing in a focal length range (36 mm to 105 mm) from the middle to the longest focal length conditions. Also, a two-unit zoom lens system of positive, negative configuration is known as a product where all the lens units are moved out to perform focusing in the focal length range from the shortest to the middle focal length conditions and the first lens unit is moved out to perform focusing in the focal length range from the middle to the longest focal length conditions.

However, the former lens system presents a problem that the back focal length is extremely short in the focal length range from the shortest to the middle focal length conditions. If the back focal length is too short, the lens diameter increases, so that the size of the lens system increases. In the latter lens system where all the lens units are moved out to perform focusing, since the weight of the moved lenses is great, the size of the lens system increases due to a restriction on the mechanism for moving the lens units.

SUMMARY OF THE INVENTION

An object of the present invention is to provide a zoom lens system enabling a closer photography while maintaining excellent optical performance and compactness.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

In a zoom lens system of the present invention, a lens unit of positive refractive power is used to perform focusing in the focal length range from the shortest to the middle focal length conditions and a lens unit of negative refractive power is used to perform focusing in the focal length range from the middle to the longest focal length conditions. Further, the following condition (1) is fulfilled:

$$0.08 < \frac{B_f}{\Delta t} < 3 \qquad (1)$$

where $B_f$ is a distance from the rear end surface of the lens system to the film at the shortest focal length condition and $\Delta t$ is a diagonal length of the film In the focal length range from the shortest to the middle focal length conditions, by using the positive lens unit to perform focusing, the reduction in image illumination and the increase in coma can be restrained in close photography. In the focal length range from the middle to the longest focal length conditions, by using the negative lens unit to perform focusing, the increase in spherical aberration and coma can be restrained in close photography.

By fulfilling the condition (1), a sufficient back focal length can be secured in the focal length range from the shortest to the longest focal length conditions. When the lower limit of the condition (1) is exceeded, the rear surface of the lens system is too close to the film, so that the lens diameter increases. This is adverse to the size reduction along the diameter. Further, since the angle to the film surface is acuter, the illumination decreases according to the $\cos^4\theta$ rule. When the upper limit of the condition (1) is exceeded, the total length of the optical system increases.

In the present invention, it is preferable to arrange the positive lens unit on the object side of the negative lens unit for the following reason: With such an arrangement, a required close photography performance can be secured and the total length of the optical system can be reduced. Therefore, for example, a long focal length zoom lens system and a compact zoom lens system for a lens shutter camera where the back focal length can be short to some degree can be realized.

In the present invention, it is preferable that a zoom lens system comprises two lens units of positive, negative configuration, that the first lens unit is used to perform focusing in the focal length range from the shortest to the middle focal length conditions, and that the second lens unit is used to perform focusing in the focal length range from the middle to the longest focal length conditions. With the two unit arrangement of positive, negative configuration, a compact zoom lens system for a lens shutter camera can be realized. Regarding the performance at the time of focusing, in the focal length range from the shortest to the middle focal length conditions, the decrease in illumination in close photography can be restrained by using the first lens unit to perform focusing. In the focal length range from the middle to the longest focal length conditions, the increase in coma and axial chromatic aberration in close photography can be restrained by using the second lens unit to perform focusing.

Alternatively, it is preferable that a zoom lens system comprises four lens units of positive, negative, positive, negative configuration, that the first lens unit is used to perform focusing in the focal length range from the shortest to the middle focal length conditions, and that the fourth lens unit is used to perform focusing in the focal length range from the middle to the longest focal length conditions. With the four unit arrangement of positive, negative, positive, negative configuration, a telephoto zoom lens system can be realized. Regarding the performance at the time of focusing, in the focal length range from the shortest to the middle focal length conditions, the increase in coma and field curvature can be restrained by using the first lens unit to perform focusing. In the focal length range from the middle to the longest focal length conditions, the increase in coma on the under side and lateral chromatic aberration can be restrained by using the fourth lens unit to perform focusing.

In the above-described four unit arrangement, to improve the performance at the time of focusing, the following conditions (2) and (3) are preferably fulfilled:

$$0.3 < \frac{f_W}{f_1} < 2.5 \quad (2)$$

$$2 < \frac{f_T}{|f_4|} < 20 \quad (3)$$

where $f_W$ is a focal length of the entire lens system at the shortest focal length condition, $f_T$ is a focal length of the entire lens system at the longest focal length condition, $f_1$ is a focal length of the first lens unit, and $f_4$ is a focal length of the fourth lens unit.

When the lower limit of the condition (2) is exceeded, it is difficult to correct coma and field curvature. When the upper limit of the condition (2) is exceeded, field curvature is generated on the over side. When the lower limit of the condition (3) is exceeded, it is difficult to restrain coma on the under side and lateral magnification. When the upper limit of the condition (3) is exceeded, coma is generated on the over side.

When a positive lens unit is arranged on the object side of a negative lens unit or when a two or a four unit arrangement is employed as described above, since the first lens unit is moved toward the object side in zooming from the shortest to the longest focal length conditions, the length of the lens barrel is maximum at the longest focal length condition. Performing focusing at the longest focal length condition without using the first lens unit prevents a further increase in the length of the lens barrel. This effect is greater when an independent actuator is used for moving each lens unit. When a piezoelectric actuator is used, each lens unit can independently be moved, so that focusing is easily performed.

In the present invention, it is preferable to arrange the negative lens unit on the object side of the positive lens unit for the following reason: With such an arrangement, a required close photography performance can be secured and a relatively long back focal length can be obtained, so that a zoom lens system can be realized with a zoom range starting from the shortest focal length condition.

It is preferable that a zoom lens system comprises two lens units of negative, positive configuration where the negative lens unit is arranged on the object side of the positive lens unit, that the second lens unit is used to perform focusing in the focal length range from the shortest to the middle focal length conditions, and that the first lens unit is used to perform focusing in the focal length condition from the middle to the longest focal length conditions. With the two unit arrangement of negative, positive configuration, a compact zoom lens system for a single-lens reflex camera with a zoom range starting from the shortest focal length condition can be realized. Regarding the performance at the time of focusing, in the focal length range from the shortest to the middle focal length conditions, the decrease in illumination is reduced by using the second lens unit to perform focusing. In the focal length range from the middle to the longest focal length conditions, the increase in coma can be restrained by using the first lens unit to perform focusing. This arrangement is effective in correcting distortion at the shorter focal length condition.

It is preferable that a zoom lens system comprises three lens units of negative, positive, negative configuration where the negative lens unit is arranged on the object side of the positive lens unit, that the second lens unit is used to perform focusing in the focal length range from the shortest to the middle focal length conditions, and that the first lens unit is used to perform focusing in the focal length range from the middle to the longest focal length conditions. With the three unit arrangement of negative, positive, negative configuration, a compact zoom lens system for a single-lens reflex camera with a zooming range starting from the shortest focal length condition can be realized. Regarding the performance at the time of focusing, in the focal length range from the shortest to the middle focal length conditions, the decrease in illumination can be reduced and the increase in coma and lateral chromatic aberration can be restrained by using the second lens unit to perform focusing. In the focal length range from the middle to the shortest focal length conditions, the increase in spherical aberration, coma and lateral chromatic aberration can be restrained by using the first lens unit to perform focusing. This arrangement is effective in correcting distortion at the longest focal length condition.

In the three unit arrangement of negative, positive, negative configuration, to improve the performance at the time of focusing, the following conditions (4) and (5) are preferably fulfilled:

$$0.5 < \frac{f_W}{f_2} < 3 \qquad (4)$$

$$0.3 < \frac{f_T}{|f_1|} < 5 \qquad (5)$$

where $f_2$ is a focal length of the second lens unit.

When the lower limit of the condition (4) is exceeded, it is difficult to restrain the increase in coma and lateral chromatic aberration in the focal length range from the shortest to the middle focal length conditions. When the upper limit of the condition (4) is exceeded, it is difficult to restrain the increase in field curvature on the under side in the focal length range from the middle to the longest focal length conditions. When the lower limit of the condition (5) is exceeded, it is difficult to restrain the increase in spherical aberration, coma and lateral chromatic aberration in the focal length range from the middle to the longest focal length conditions. When the upper limit of the condition (5) is exceeded, spherical aberration inclines toward the under side in the focal length range from the middle to the longest focal length conditions.

In the present invention, it is preferable to perform focusing by moving both of the positive and negative lens units used for focusing in each focal length range. By moving both of the lens units in each focal length range, illumination and aberrations such as coma, spherical aberration and chromatic aberration can more excellently be corrected.

Numerical data of first to fourth embodiments of the present invention are shown in Tables 1 to 4. In each table, ri (i=1,2,3, . . .) represents a radius of curvature of an ith lens surface counted from the object side, di (i=1,2,3, . . .) represents an ith axial distance counted from the object side, Ni (i=1,2,3, . . .) and vi (i=1,2,3, . . .) represent a refractive index and an Abbe number to the d-line of an ith lens surface counted from the object side. Focal lengths f of the entire lens system at the shortest focal length condition (W), at the middle focal length condition (M) and at the longest focal length condition (T), and an F-number FNO. are also shown.

In each table, the surfaces marked with asterisks (*) are aspherical and defined by the following expression representing the surface configuration of an aspherical surface:

$$X = \frac{C \cdot Y^2}{1 + (1 - \epsilon \cdot Y^2 \cdot C^2)^{\frac{1}{2}}} + \sum_i A_i Y^i$$

where X is an amount of displacement from a reference surface along the optical axis, Y is a height in a direction vertical to the optical axis, C is a paraxial radius of curvature, $\epsilon$ is a conic constant, and Ai is an ith-order aspherical coefficient.

FIGS. 1 to 4 are cross-sectional views showing the lens arrangements of the first to fourth embodiments at the shortest focal length condition (W). Loci m1 to m4 in the figures schematically show the movements of a first lens unit Gr1, a second lens unit Gr2, a third lens unit Gr3 and a fourth lens unit Gr4 from the shortest focal length condition (W) to the longest focal length condition. (T) during zooming.

Figure 1:
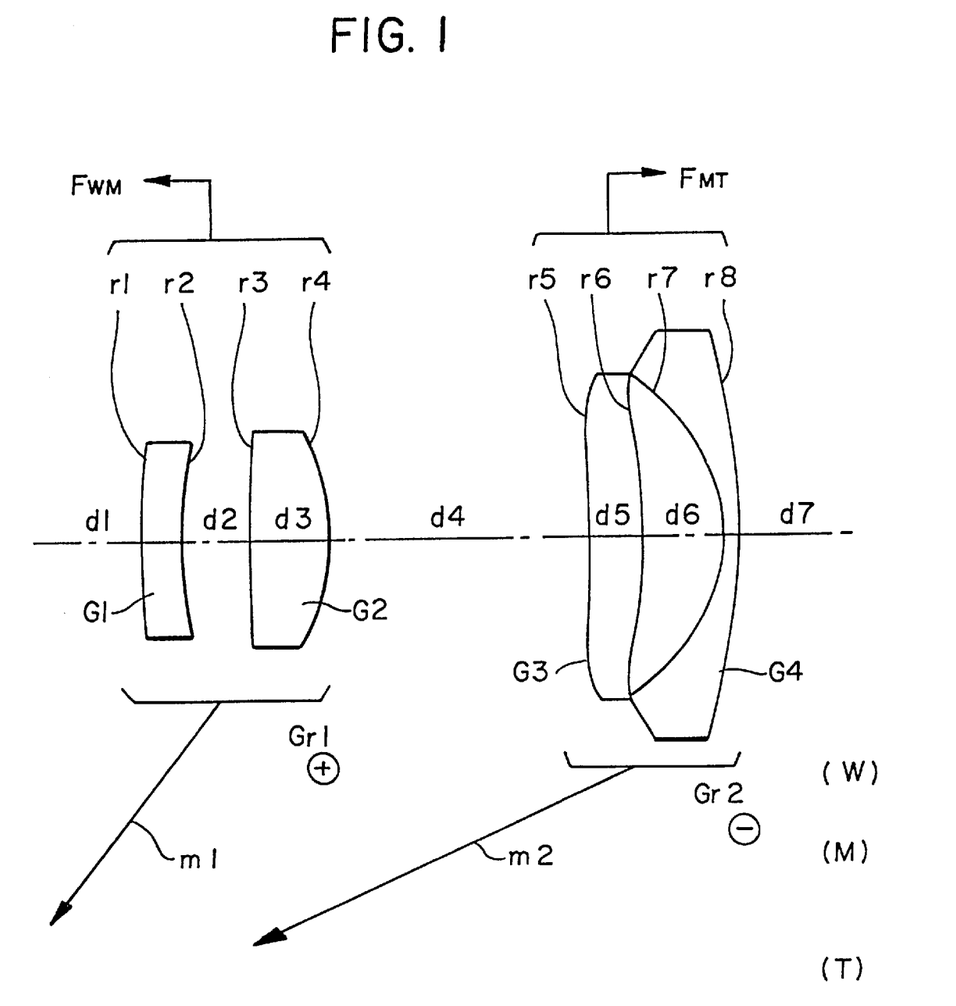
FIG. 1 is a cross-sectional view showing the lens arrangement of a first embodiment of the present invention.

The first embodiment comprises from the object side: a first lens unit Gr1 of positive refractive power including a negative meniscus lens element concave to the image side (first lens element G1) and a positive bi-convex lens element (second lens element G2); and a second lens unit Gr2 of negative refractive power including a positive meniscus lens element convex to the image side (third lens element G3) and a negative meniscus lens element concave to the object side (fourth lens element G4). The both side surfaces of the first lens element G1 and the both side surfaces of the third lens element G3 are aspherical. In the focal length range from the shortest focal length condition (W) to the middle focal length condition (M), the first lens unit Gr1 of positive refractive power is used to perform focusing as shown by an arrow $F_{WM}$. In the focal length range from the middle focal length condition (M) to the longest focal length condition (T), the second lens element Gr2 is used to perform focusing as shown in an arrow $F_{MT}$.

Figure 2:
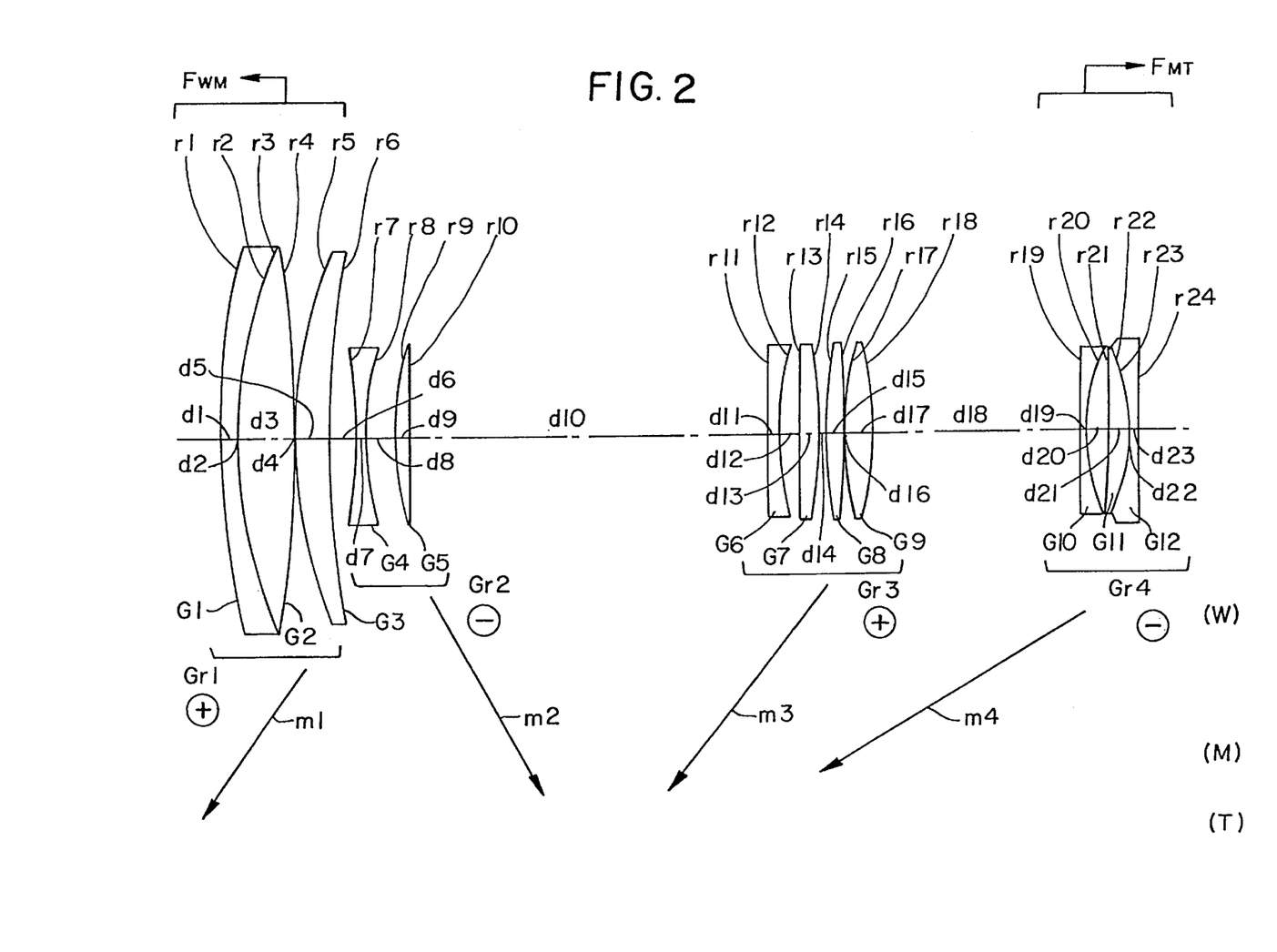
FIG. 2 is a cross-sectional view showing the lens arrangement of a second embodiment of the present invention.

The second embodiment comprises from the object side: a first lens unit Gr1 of positive refractive power including a negative meniscus lens element concave to the image side (first lens element G1), a positive bi-convex lens element (second lens element G2) and a positive meniscus lens element convex to the object side (third lens element G3); a second lens unit Gr2 of negative refractive power including a negative bi-concave lens element (fourth lens element G4) and a positive bi-convex lens element (fifth lens element G5); a third lens unit Gr3 of positive refractive power including a negative bi-concave lens element (sixth lens element G6) and three positive bi-convex lens elements (seventh to ninth lens elements G7 to G9); and a fourth lens unit Gr4 of negative refractive power including a negative meniscus lens element concave to the image side (tenth lens element G10), a positive meniscus lens element convex to the image side (eleventh lens element G11) and a negative bi-concave lens element (twelfth lens element G12). In the focal length range from the shortest focal length condition (W) to the middle focal length condition (M), the first lens unit Gr1 of positive refractive power is used to perform focusing as shown by the arrow $F_{WM}$. In the focal length range from the middle focal length condition (M) to the longest focal length condition (T), the fourth lens unit Gr4 of negative refractive power is used to perform focusing as shown by the arrow $F_{MT}$.

Figure 3:
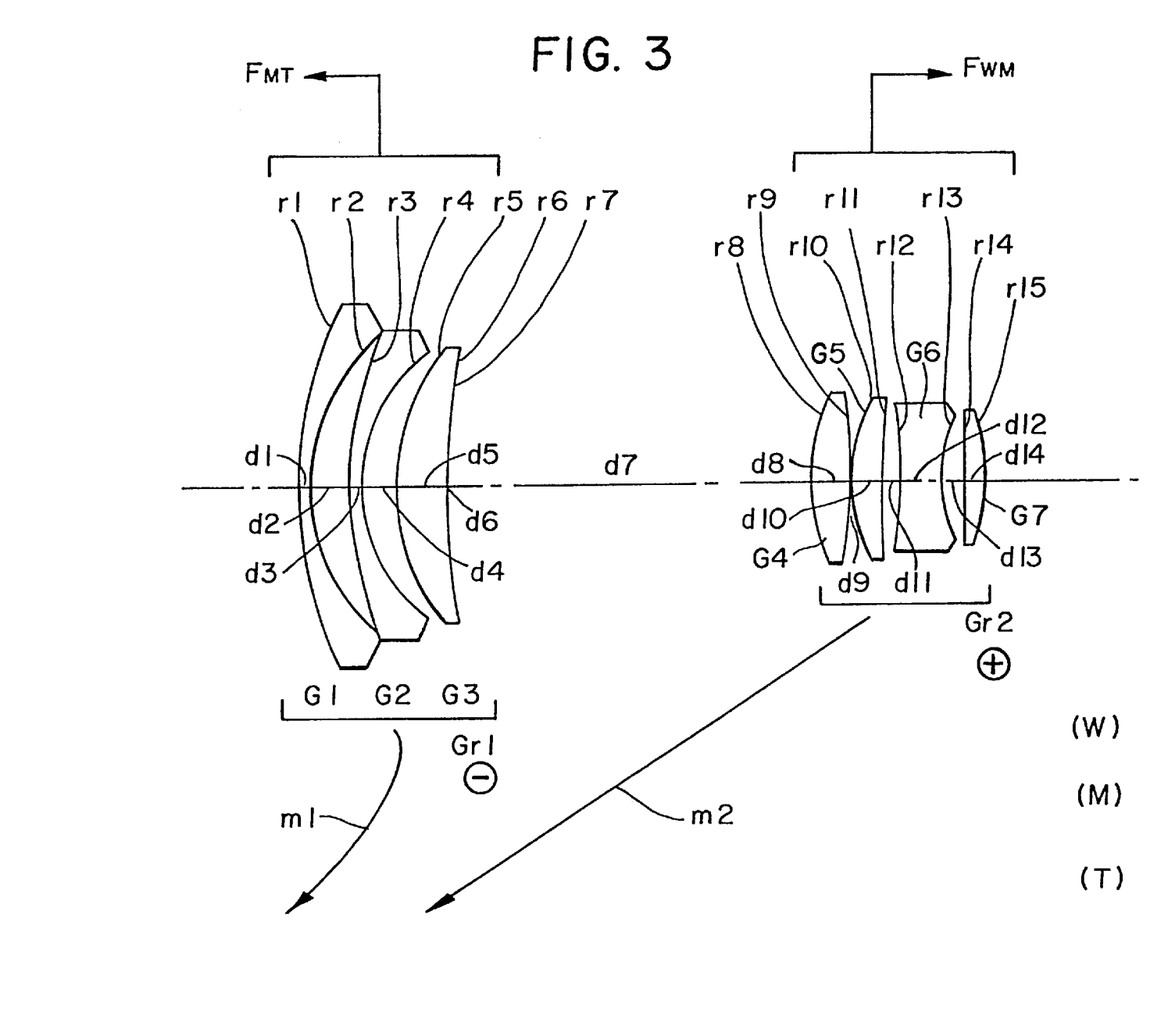
FIG. 3 is a cross-sectional view showing the lens arrangement of a third embodiment of the present invention.

The third embodiment comprises from the object side: a first lens unit Gr1 of negative refractive power including two negative meniscus lens elements concave to the image side (first and second lens elements G1 and G2) and a positive meniscus lens element convex to the object side (third lens element G3); and a second lens unit Gr2 of positive refractive power including a positive bi-convex lens element (fourth lens element G4), a positive meniscus lens element convex to the object side (fifth lens element G5), a negative bi-concave lens element (sixth lens element G6) and a positive bi-convex lens element (seventh lens element G7). The image side surface of the third lens element G3 is aspherical. In the focal length range from the shortest focal length condition (W) to the middle focal length condition (M), the second lens unit Gr2 of positive refractive power is used to perform focusing as shown by the arrow $F_{WM}$. In the focal length range from the middle focal length condition (M) to the longest focal length condition (T), the first lens unit Gr1 of negative refractive power is used to perform focusing as shown by the arrow $F_{MT}$.

Figure 4:
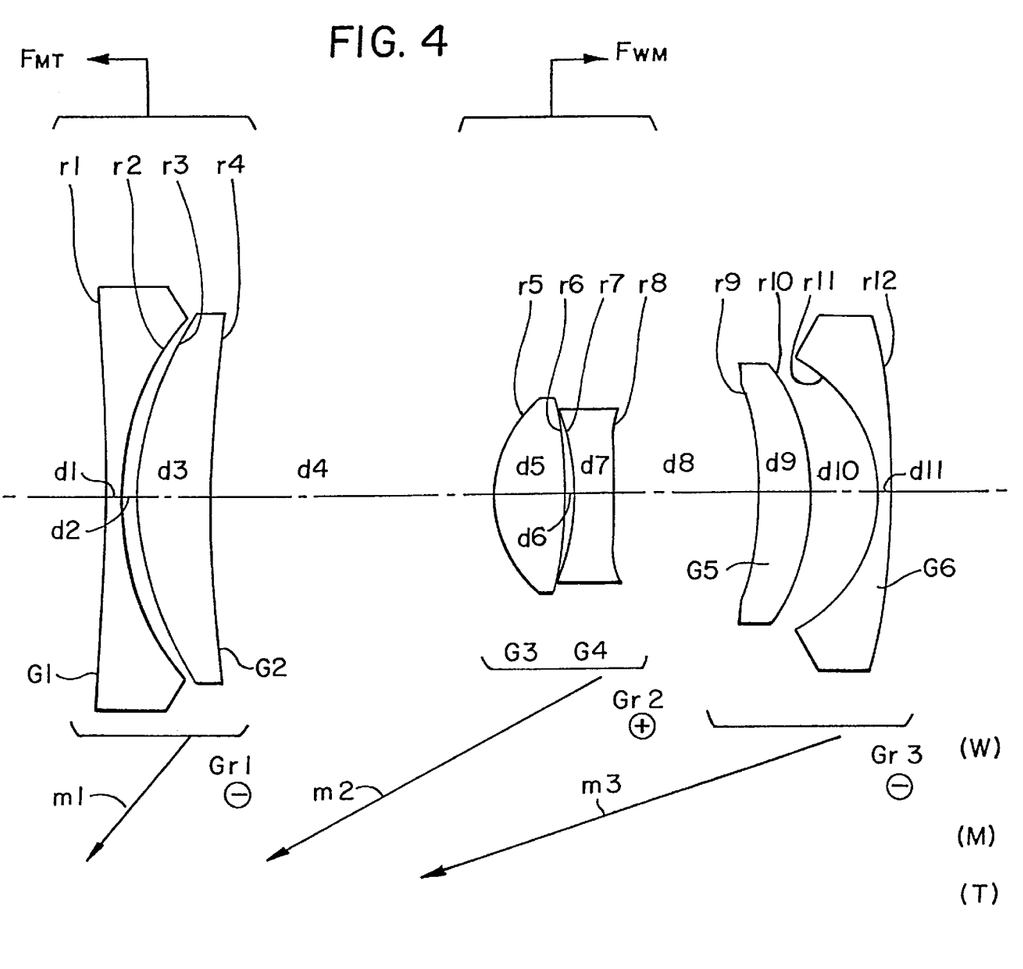
FIG. 4 is a cross-sectional view showing the lens arrangement of a fourth embodiment of the present invention.
Figure 5A:
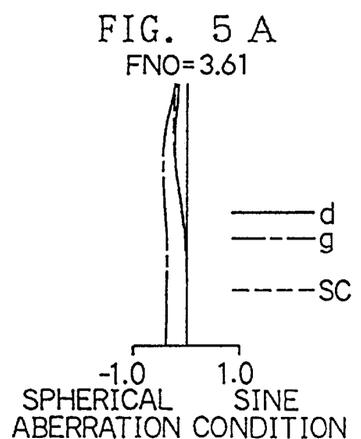
FIGS. 5A to 5I show aberration curves of the first embodiment of the present invention when the subject is at infinity.
Figure 5B:
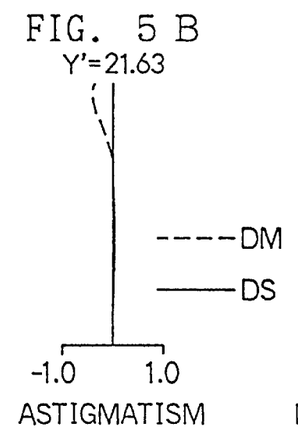
Figure 5C:
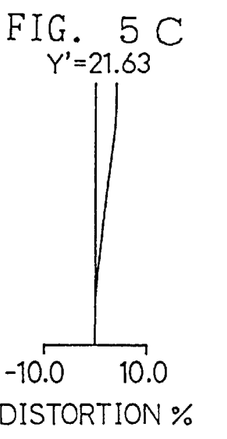
Figure 5D:
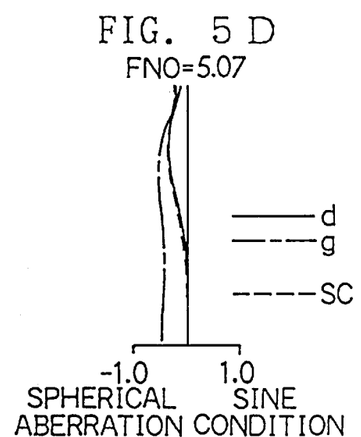
Figure 5E:
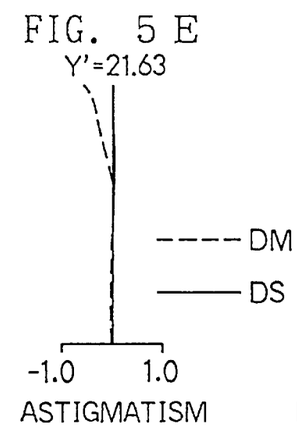
Figure 5F:
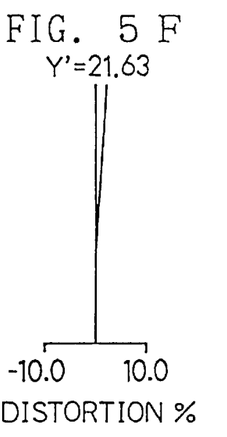
Figure 5G:
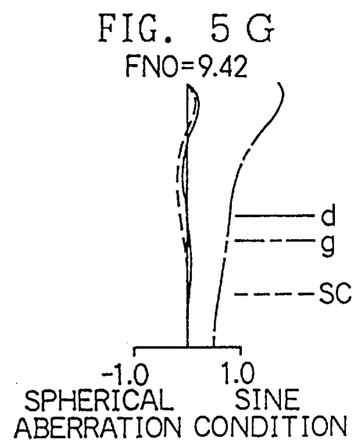
Figure 5H:
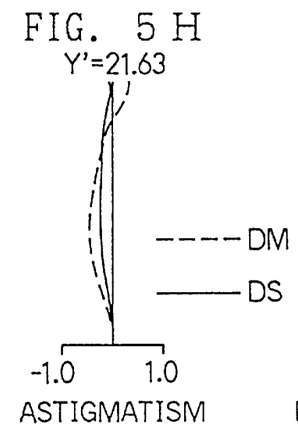
Figure 5I:
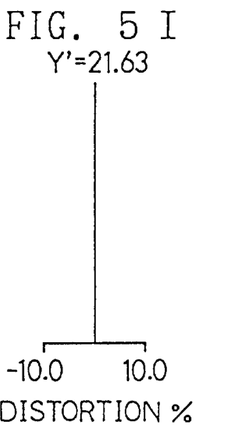
Figure 6A:
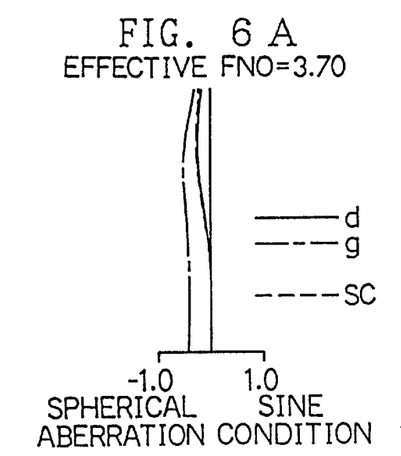
FIGS. 6A to 6I show aberration curves of the first embodiment of the present invention when the subject distance is minimum.
Figure 6B:
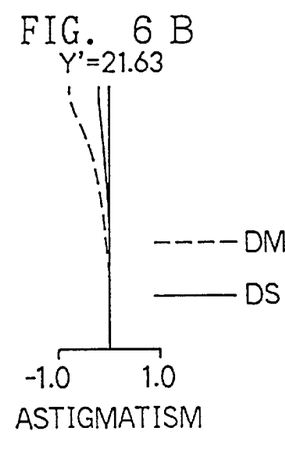
Figure 6C:
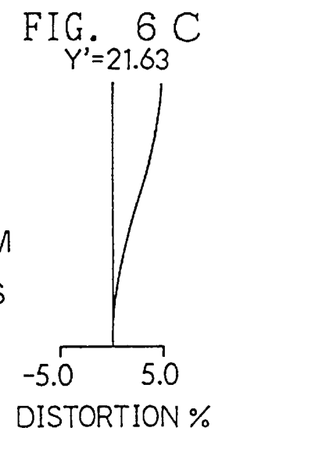
Figure 6D:
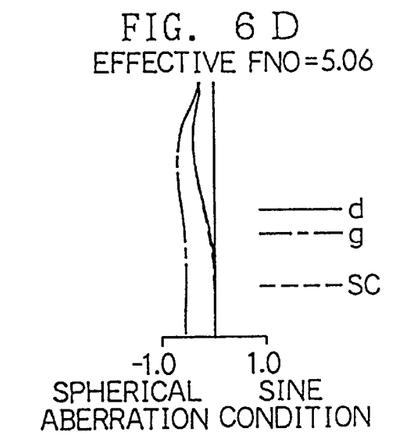
Figure 6E:
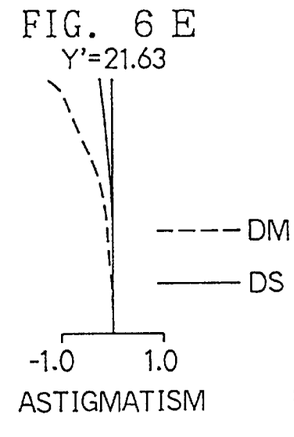
Figure 6F:
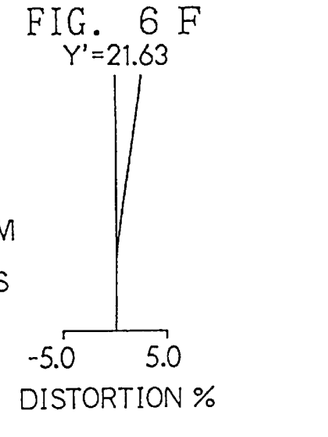
Figure 6G:
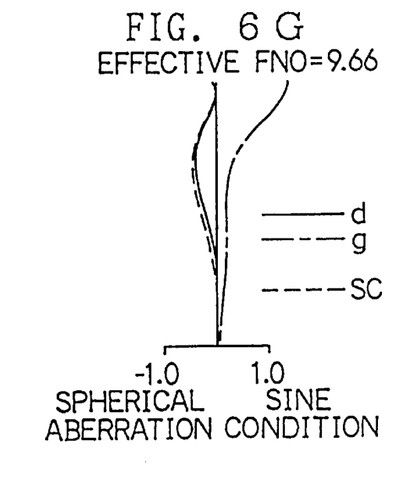
Figure 6H:
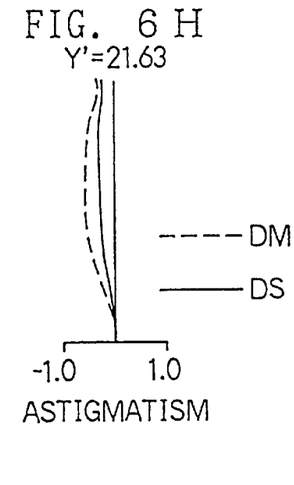
Figure 6I:
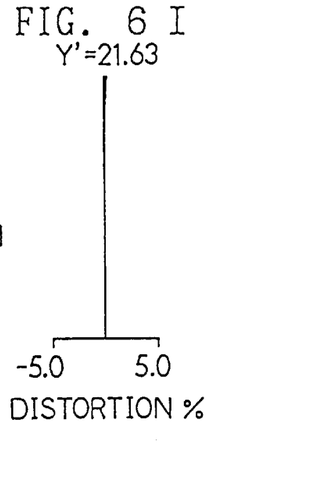
Figure 7A:
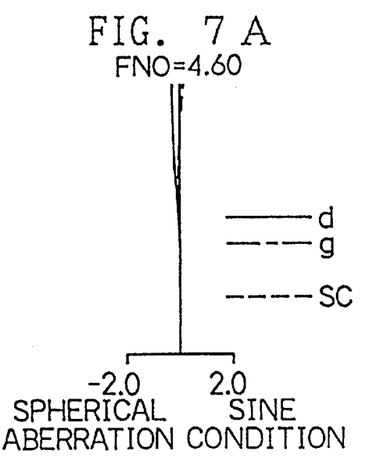
FIGS. 7A to 7I show aberration curves of the second embodiment of the present invention when the subject is at infinity.
Figure 7B:
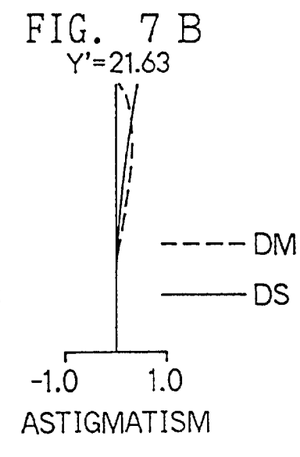
Figure 7C:
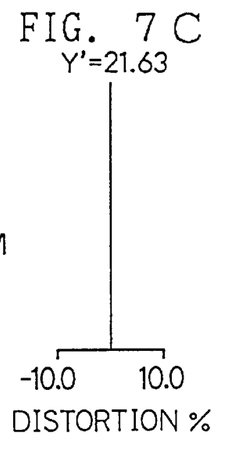
Figure 7D:
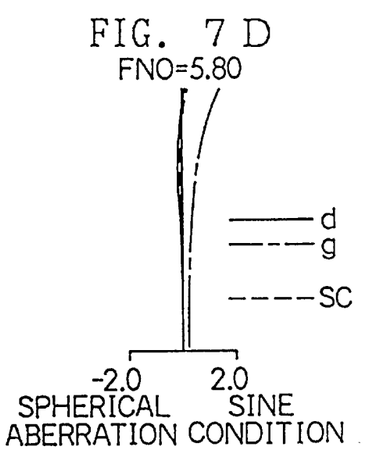
Figure 7E:
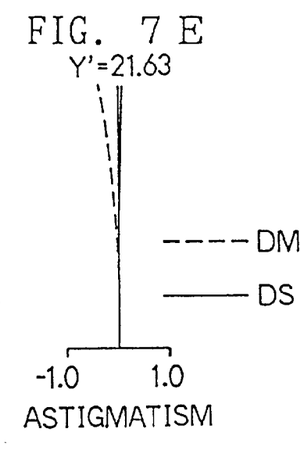
Figure 7F:
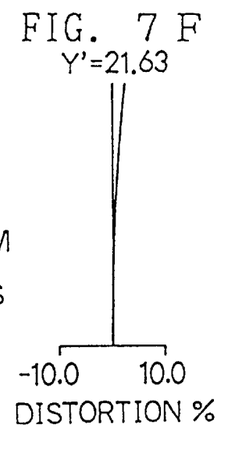
Figure 7G:
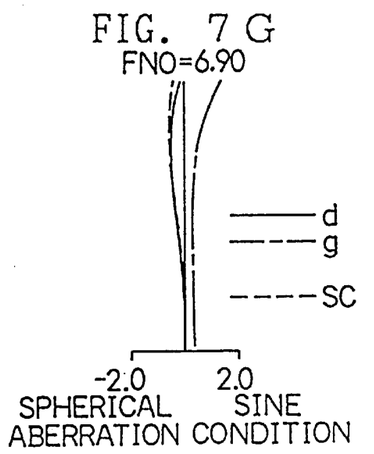
Figure 7H:
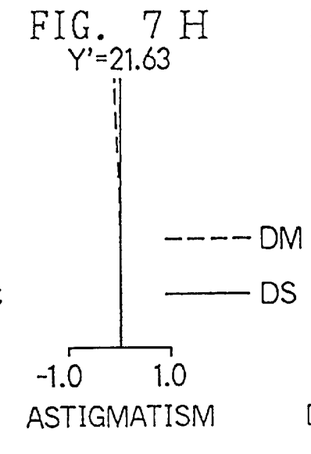
Figure 7I:
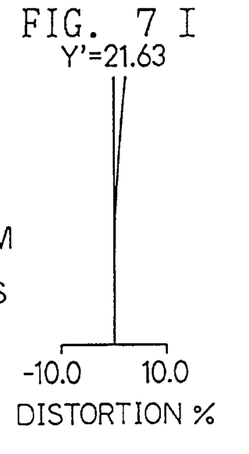
Figure 8A:
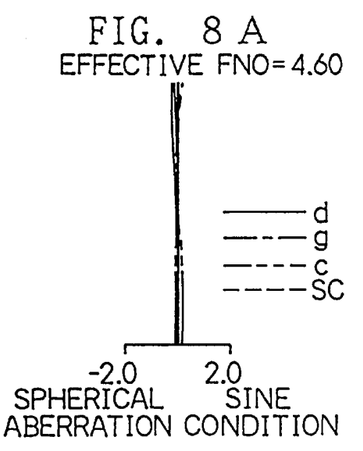
FIGS. 8A to 8I show aberration curves of the second embodiment of the present invention when the subject distance is minimum.
Figure 8B:
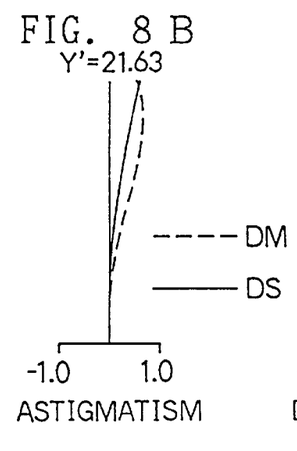
Figure 8C:
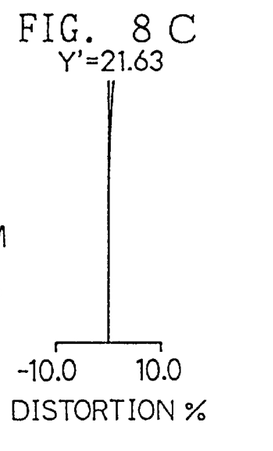
Figure 8D:
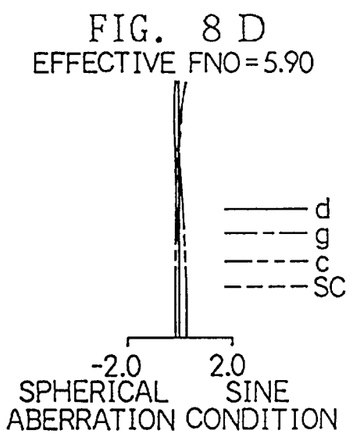
Figure 8E:
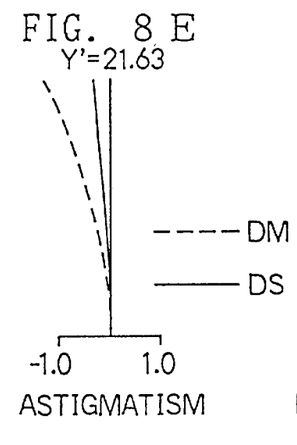
Figure 8F:
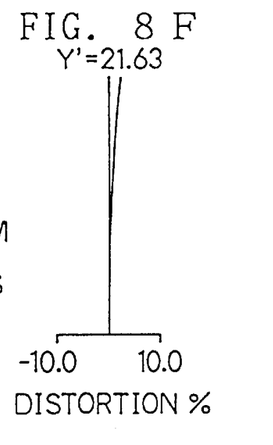
Figure 8G:
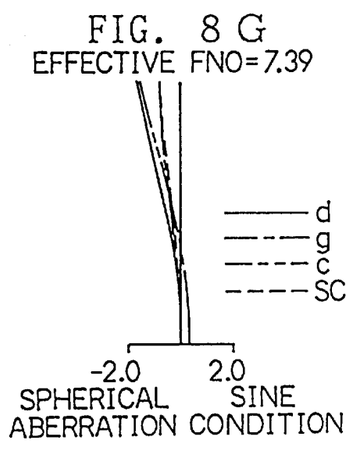
Figure 8H:
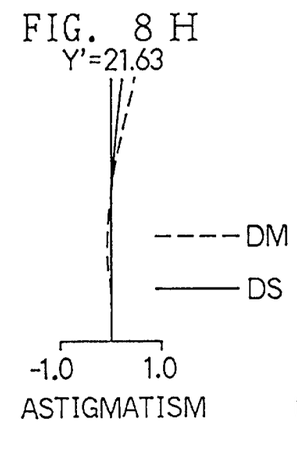
Figure 8I:
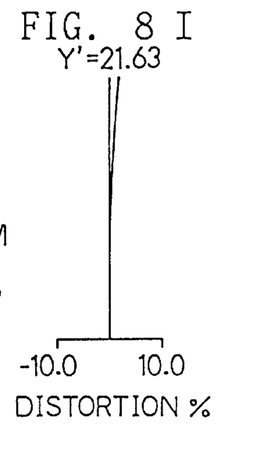
Figure 9A:
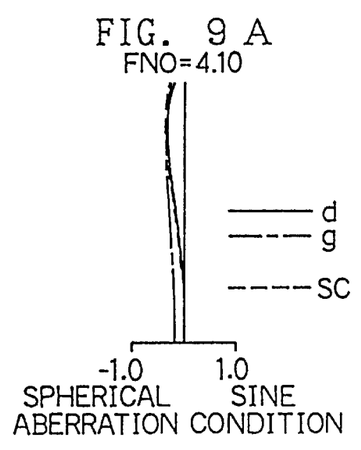
FIGS. 9A to 9I show aberration curves of the third embodiment of the present invention when the subject is at infinity.
Figure 9B:
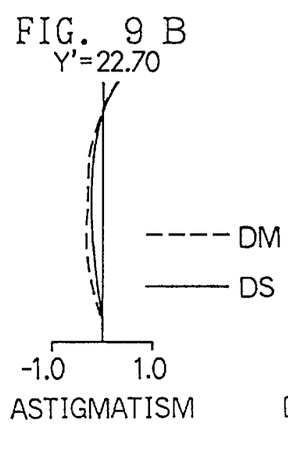
Figure 9C:
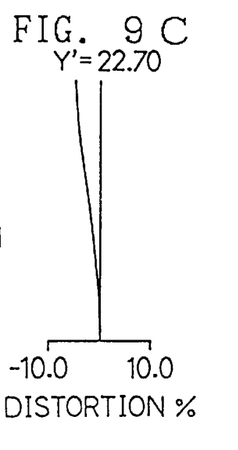
Figure 9D:
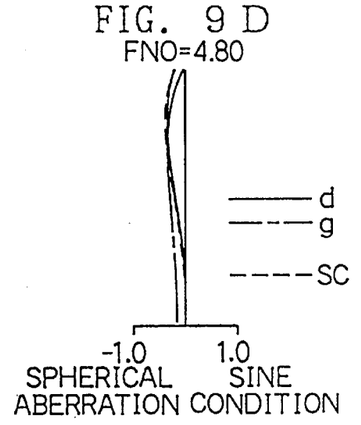
Figure 9E:
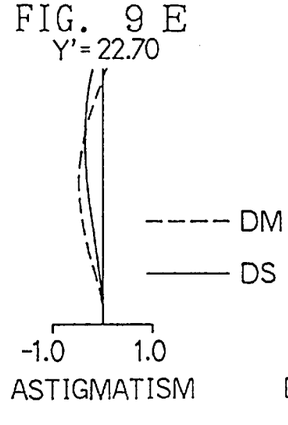
Figure 9F:
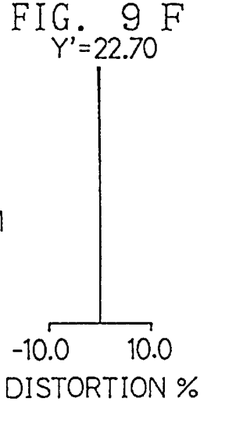
Figure 9G:
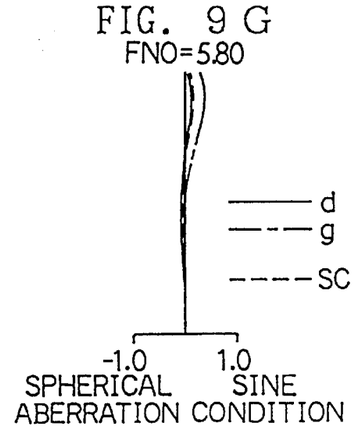
Figure 9H:
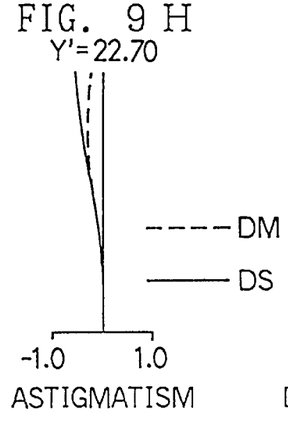
Figure 9I:
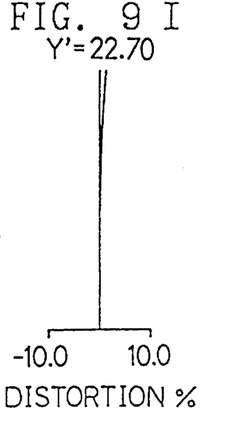
Figures 10A, 10B, 10C:
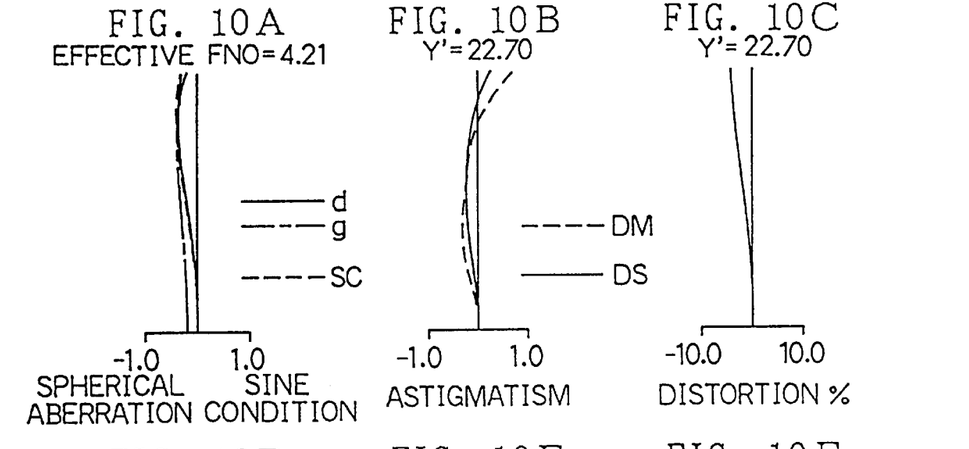
FIGS. 10A to 10I show aberration curves of the third embodiment of the present invention when the subject distance is minimum.
Figures 10D, 10E, 10F:
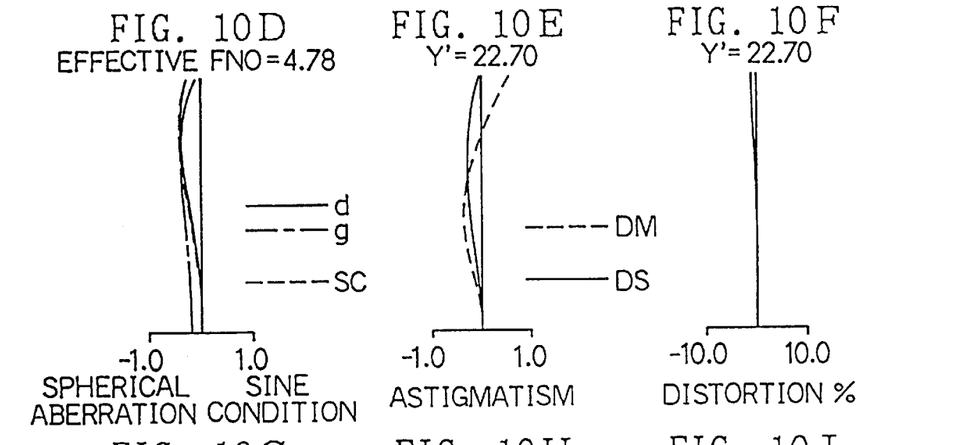
Figures 10G, 10H, 10I:
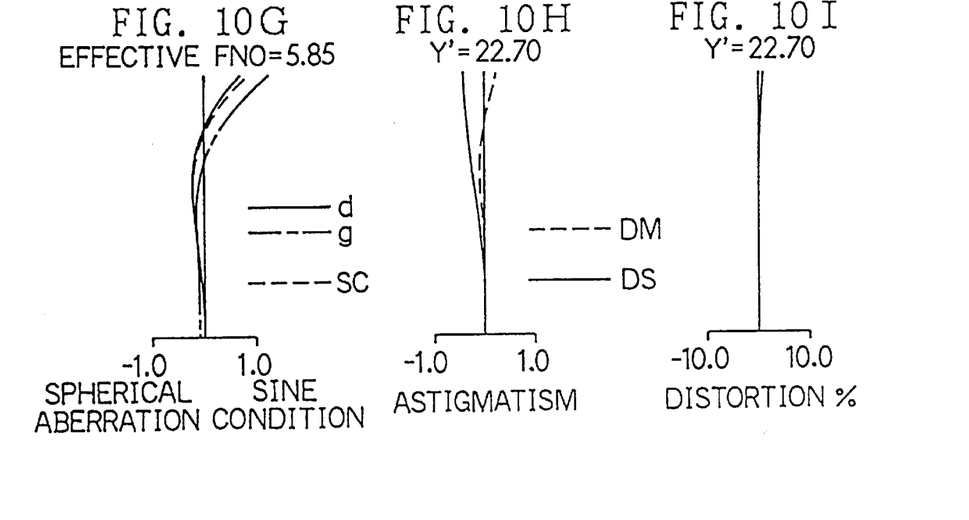
Figure 11A:
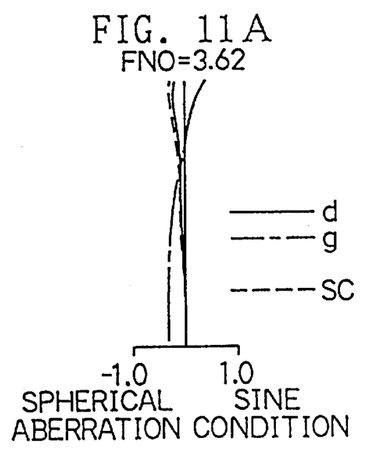
FIGS. 11A to 11I show aberration curves of the fourth embodiment of the present invention when the subject is at infinity.
Figure 11B:
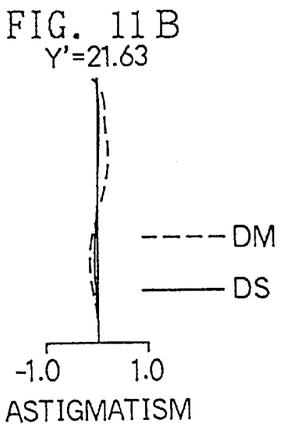
Figure 11C:
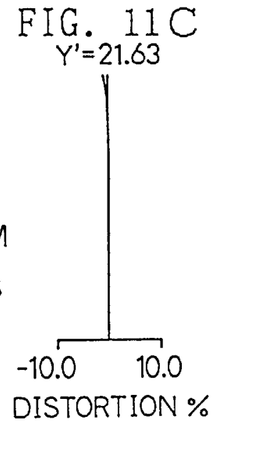
Figure 11D:
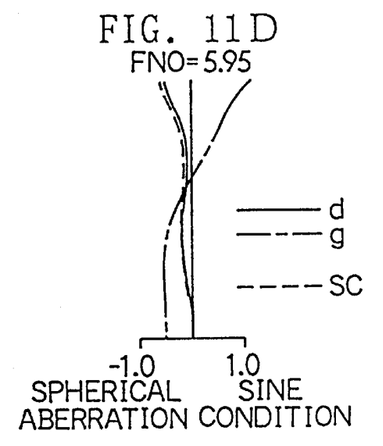
Figure 11E:
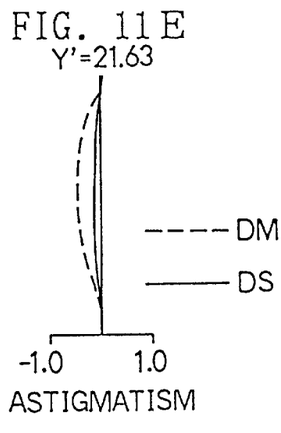
Figure 11F:
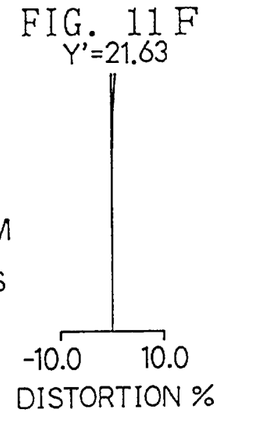
Figure 11G:
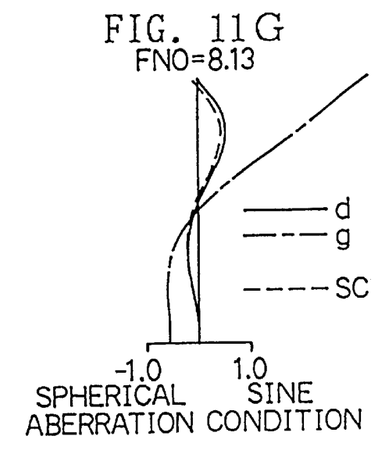
Figure 11H:
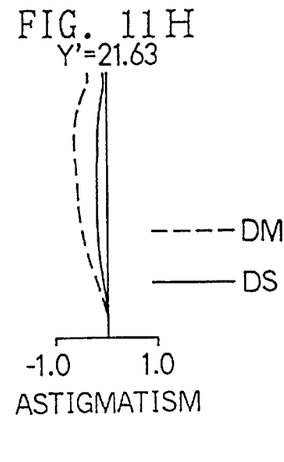
Figure 11I:
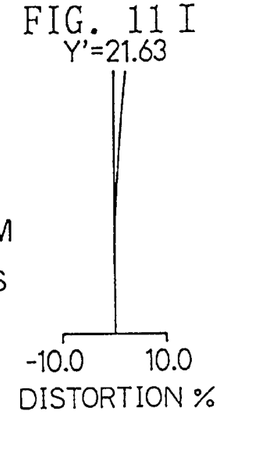
Figure 12A:
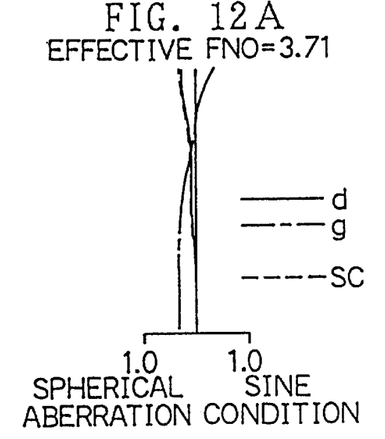
FIGS. 12A to 12I show aberration curves of the fourth embodiment of the present invention when the subject distance is minimum.
Figure 12B:
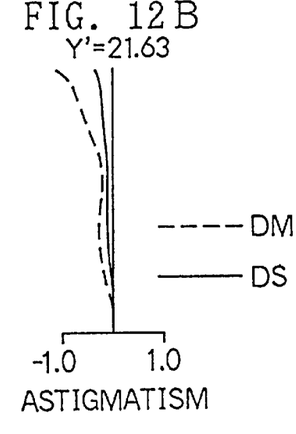
Figure 12C:
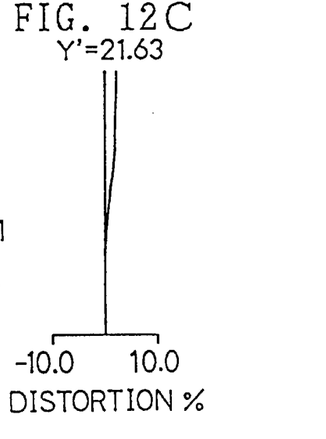
Figure 12D:
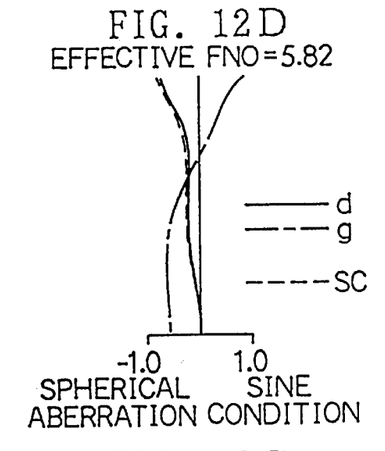
Figure 12E:
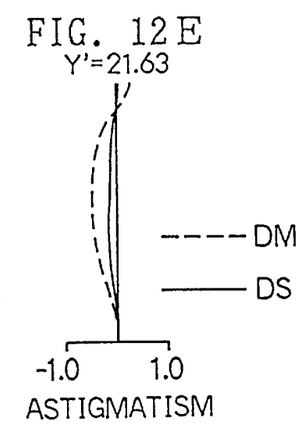
Figure 12F:
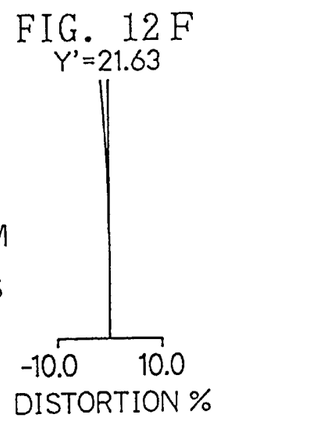
Figure 12G:
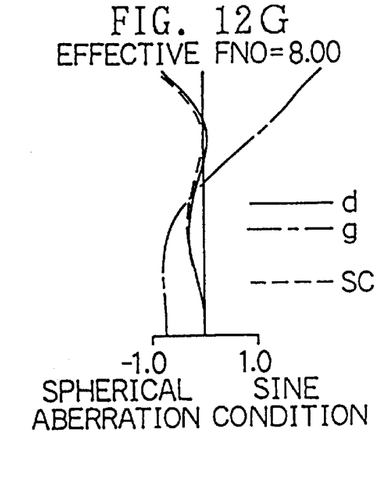
Figure 12H:
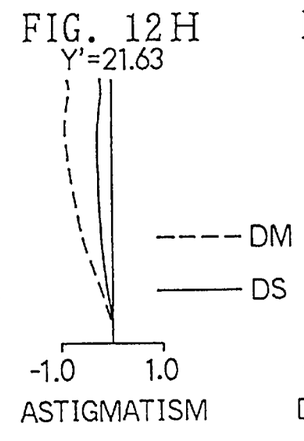
Figure 12I:
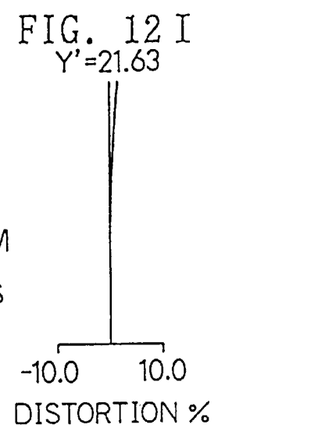

The fourth embodiment comprises from the object side: a first lens unit Gr1 of negative refractive power including a negative bi-concave lens element (first lens G1) and a positive meniscus lens element convex to the object side (second lens G2); a second lens unit Gr2 of positive refractive power including a positive bi-convex lens element (third lens element G3) and a negative meniscus lens element concave to the object side (fourth lens element G4); and a third lens unit Gr3 of negative refractive power including a positive meniscus lens element convex to the image side (fifth lens element G5) and a negative meniscus lens element concave to the object side (sixth lens element G6). The both side surfaces of the fourth lens element G4 and the object side surface of the fifth lens element G5 are aspherical. In the focal length range from the shortest focal length condition (W) to the middle focal length condition (M), the second lens unit Gr2 of positive refractive power is used to perform focusing as shown by the arrow $F_{WM}$. In the focal length range from the middle focal length condition (M) to the longest focal length condition (T), the first lens unit Gr1 of negative refractive power is used to perform focusing as shown by the arrow $F_{MT}$.

FIGS. 5A to 5I through 12A to 12I show aberration curves of the first to fourth embodiments. FIGS. 5A to 5I, 7A to 7I, 9A to 9I and 11A to 11I show aberration curves when the subject is at infinity. FIGS. 6A to 6I, 8A to 8I, 10A to 10I and 12A to 12I show aberration curves when the subject distance is minimum. The object distance D is 0.8 m in the first embodiment (FIGS. 6A to 6I), 1.5 m in the second embodiment (FIGS. 8A to 8I), 0.8 m in the third embodiment (FIGS. 10A to 10I) and 0.6 m in the fourth embodiment (FIGS. 12A to 12I). FIGS. 5A to 5C, 6A to 6C, 7A to 7C, 8A to 8C, 9A to 9C, 10A to 10C, 11A to 11C and 12A to 12C show aberration curves at the shortest focal length condition (W). FIGS. 5D to 5F, 6D to 6F, 7D to 7F, 8D to 8F, 9D to 9F, 10D to 10F, 11D to 11F and 12D to 12F show aberration curves at the middle focal length condition (M). FIGS. 5G to 5I, 6G to 6I, 7G to 7I, 8G to 8I, 9G to 9I, 10G to 10I, 11G to 11I and 12G to 12I show aberration curves at the longest focal length condition (T). The solid lines d represent aberrations to the d-line. The dash and dotted lines g represent aberration curves to the g-line. The chain double-dashed lines c represent aberration curves to the c-line. The broken lines SC represent sine conditions. The broken lines DM and the solid lines DS represent astigmatism on the meridional and sagittal image planes, respectively.

Values of the conditions (1) to (5) in the first to fourth embodiments are shown in Table 5. The aberration coefficients of the second to fourth embodiments at the shortest focal length condition (W) and the longest focal length condition (T) when the subject is at infinity and the subject distance is minimum are shown in Tables 6 to 8. As the aberration coefficients when the subject distance is minimum, aberration coefficients when focusing is performed by using each of the lens unit used for focusing (the first lens unit Gr1, the second lens unit Gr2 and the fourth lens unit Gr4) are also shown. to compare the case where the lens unit actually used for focusing in the focal length range is used and the case where the other of the lens units used for focusing is used instead.

It is understood from Tables 6 to 8 that it is advantageous in correcting aberrations to use different lens units for focusing in different focal length ranges in each embodiment. The closer to 0 the aberration coefficient is, the more excellent the aberration performance is. Therefore, since the aberration coefficient is closer to 0 when the first lens unit Gr1 is used to perform focusing than when the fourth lens unit Gr4 is used to perform focusing at the shortest focal length condition (W) and closer to 0 when the fourth lens unit Gr4 is used to perform focusing than when the first lens unit Gr1 is used to perform focusing at the longest focal length condition (T), field curvature is more excellently corrected by the previously-described focusing method of the second embodiment.

In the second embodiment, at the shortest focal length condition (W), coma and field curvature are excellently corrected, and at the longest focal length condition (T), although spherical aberration and coma are not excellent, the aberration level is excellent since they are corrected on higher order, and field curvature is excellently corrected. In the third embodiment, while the aberration coefficient is substantially the same at the shortest focal length condition (W), coma is excellently corrected at the longest focal length condition (T). In the fourth embodiment, while the aberration coefficient is the same at the shortest focal length condition (W), spherical aberration is excellently corrected at the longest focal length condition.

Obviously, many modifications and variations of the present invention are possible in light of the above teachings. It is therefore to be understood that within the scope of the appended claims, the invention may be practiced other than as specifically described.

TABLE 1

(1st Embodiment)

| f = 39.1 to 55.0 to 102.1 | | FNO. = 3.6 to 5.1 to 9.4 | |
|---|---|---|---|
| Radius of Curvature | Axial Distance | Refractive Index | Abbe Number |
| r1* 34.261 | | | |
| | d1 2.500 | N1 1.84506 | v1 23.66 |
| r2* 21.818 | | | |
| | d2 4.400 | | |
| r3 128.904 | | | |
| | d3 4.900 | N2 1.58913 | v2 61.25 |
| r4 −14.590 | | | |
| | d4 16.559 to 10.810 to 4.275 | | |
| r5* −67.105 | | | |
| | d5 3.300 | N3 1.58340 | v3 30.23 |
| r6* −34.388 | | | |
| | d6 4.880 | | |
| r7 −11.956 | | | |
| | d7 1.000 | N4 1.78100 | v4 44.55 |
| r8 −44.532 | | | |

Σd = 37.539 to 31.789 to 25.254

Aspherical Coefficients r1 :ε = 1.0000
A4 = −0.16966 × 10⁻³
A6 = −0.79936 × 10⁻⁶
A8 = 0.29138 × 10⁻⁸
A10 = 0.77000 × 10⁻¹⁰
A12 = −0.14876 × 10⁻¹¹ r2 :ε = 1.0000
A4 = −0.13003 × 10⁻³
A6 = −0.85242 × 10⁻⁶
A8 = 0.27253 × 10⁻⁷
A10 = −0.21163 × 10⁻⁹
A12 = −0.13969 × 10⁻¹¹
A14 = −0.65974 × 10⁻¹⁸
A16 = −0.10790 × 10⁻¹⁹ r5 :ε = 1.0000
A3 = −0.37891 × 10⁻³
A4 = 0.24109 × 10⁻³ r6 :ε = 1.0000
A3 = −0.36195 × 10⁻³
A4 = 0.13866 × 10⁻³

TABLE 1-continued (1st Embodiment)

| | |
|---|---|
| A5 = −0.41114 × 10$^{-4}$ | A5 = −0.12138 × 10$^{-4}$ |
| A6 = 0.45938 × 10$^{-5}$ | A6 = −0.29489 × 10$^{-6}$ |
| A7 = 0.87306 × 10$^{-7}$ | A7 = 0.39458 × 10$^{-7}$ |
| A8 = −0.44434 × 10$^{-7}$ | A8 = 0.44473 × 10$^{-7}$ |
| A9 = −0.42186 × 10$^{-9}$ | A9 = −0.64254 × 10$^{-8}$ |
| A10 = 0.34225 × 10$^{-10}$ | A10 = 0.10949 × 10$^{-9}$ |
| A11 = 0.82545 × 10$^{-11}$ | A11 = 0.25726 × 10$^{-10}$ |
| A12 = −0.18935 × 10$^{-11}$ | A12 = −0.17438 × 10$^{-11}$ |
| A13 = 0.74972 × 10$^{-15}$ | A13 = 0.68692 × 10$^{-13}$ |
| A14 = 0.58928 × 10$^{-15}$ | |
| A15 = 0.90229 × 10$^{-16}$ | |
| A16 = 0.10125 × 10$^{-16}$ | |

TABLE 2

(2nd Embodiment)

f = 102.5 to 300.0 to 390.0    FNO. = 4.6 to 5.8 to 6.9

| | Radius of Curvature | | Axial Distance | | Refractive Index | | Abbe Number |
|---|---|---|---|---|---|---|---|
| r1 | 130.023 | | | | | | |
| | | d1 | 2.504 | N1 | 1.85000 | ν1 | 40.04 |
| r2 | 75.029 | | | | | | |
| | | d2 | 0.100 | | | | |
| r3 | 75.029 | | | | | | |
| | | d3 | 8.008 | N2 | 1.49310 | ν2 | 83.58 |
| r4 | −224.260 | | | | | | |
| | | d4 | 0.200 | | | | |
| r5 | 73.713 | | | | | | |
| | | d5 | 4.597 | N3 | 1.48749 | ν3 | 70.44 |
| r6 | 139.197 | | | | | | |
| | | d6 | 4.000 to 65.500 to 82.207 | | | | |
| r7 | −94.599 | | | | | | |
| | | d7 | 1.401 | N4 | 1.74400 | ν4 | 44.93 |
| r8 | 44.699 | | | | | | |
| | | d8 | 4.361 | | | | |
| r9 | 51.142 | | | | | | |
| | | d9 | 2.399 | N5 | 1.75520 | ν5 | 27.51 |
| r10 | −1371.384 | | | | | | |
| | | d10 | 52.632 to 12.659 to 3.801 | | | | |
| r11 | −733.945 | | | | | | |
| | | d11 | 1.498 | N6 | 1.84666 | ν6 | 23.83 |
| r12 | 43.963 | | | | | | |
| | | d12 | 2.700 | | | | |
| r13 | 319.419 | | | | | | |
| | | d13 | 3.006 | N7 | 1.59270 | ν7 | 35.45 |
| r14 | −80.974 | | | | | | |
| | | d14 | 1.408 | | | | |
| r15 | 75.821 | | | | | | |
| | | d15 | 2.403 | N8 | 1.51823 | ν8 | 58.96 |
| r16 | −226.290 | | | | | | |
| | | d16 | 0.100 | | | | |
| r17 | 46.868 | | | | | | |
| | | d17 | 4.497 | N9 | 1.48749 | ν9 | 70.44 |
| r18 | −56.861 | | | | | | |
| | | d18 | 30.375 to 8.848 to 0.999 | | | | |
| r19 | 196.053 | | | | | | |
| | | d19 | 1.194 | N10 | 1.75450 | ν10 | 51.57 |
| r20 | 33.838 | | | | | | |
| | | d20 | 3.309 | | | | |
| r21 | −222.323 | | | | | | |
| | | d21 | 3.205 | N11 | 1.67339 | ν11 | 29.25 |
| r22 | −28.596 | | | | | | |
| | | d22 | 0.010 | N12 | 1.51400 | ν12 | 42.83 |
| r23 | −28.596 | | | | | | |
| | | d23 | 1.203 | N13 | 1.69680 | ν13 | 56.47 |
| r24 | 422.978 | | | | | | |

Σd = 135.109 to 135.109 to 135.109

TABLE 3

(3rd Embodiment)

f = 29.2 to 41.0 to 76.5    FNO. = 4.1 to 4.8 to 5.8

| | Radius of Curvature | | Axial Distance | | Refractive Index | | Abbe Number |
|---|---|---|---|---|---|---|---|
| r1 | 46.392 | | | | | | |
| | | d1 | 1.500 | N1 | 1.77551 | ν1 | 37.90 |
| r2 | 22.920 | | | | | | |
| | | d2 | 4.400 | | | | |
| r3 | 46.082 | | | | | | |
| | | d3 | 1.450 | N2 | 1.71300 | ν2 | 53.93 |
| r4 | 19.322 | | | | | | |
| | | d4 | 3.800 | | | | |
| r5 | 25.007 | | | | | | |
| | | d5 | 5.600 | N3 | 1.67339 | ν3 | 29.25 |
| r6 | 80.909 | | | | | | |
| | | d6 | 0.050 | N4 | 1.51790 | ν4 | 52.31 |
| r7* | 54.506 | | | | | | |
| | | d7 | 41.232 to 23.855 to 3.900 | | | | |
| r8 | 24.891 | | | | | | |
| | | d8 | 4.050 | N5 | 1.58913 | ν5 | 61.11 |
| r9 | −85.435 | | | | | | |
| | | d9 | 0.160 | | | | |
| r10 | 19.125 | | | | | | |
| | | d10 | 3.450 | N6 | 1.51680 | ν6 | 64.20 |
| r11 | 122.331 | | | | | | |
| | | d11 | 1.820 | | | | |
| r12 | −59.023 | | | | | | |
| | | d12 | 4.550 | N7 | 1.80741 | ν7 | 31.59 |
| r13 | 17.358 | | | | | | |
| | | d13 | 2.450 | | | | |
| r14 | 4379.433 | | | | | | |
| | | d14 | 2.450 | N8 | 1.59551 | ν8 | 39.22 |
| r15 | −24.988 | | | | | | |

Σd = 76.962 to 59.584 to 39.630

Aspherical Coefficients r7 :ε = 1.0000
A4 = −0.99880 × 10$^{-5}$
A6 = 0.61836 × 10$^{-8}$
A8 = −0.20792 × 10$^{-9}$
A10 = 0.73220 × 10$^{-12}$
A12 = −0.13569 × 10$^{-14}$

TABLE 4

(4th Embodiment)

f = 28.7 to 50.0 to 77.5    FNO. = 3.6 to 6.0 to 8.1

| | Radius of Curvature | | Axial Distance | | Refractive Index | | Abbe Number |
|---|---|---|---|---|---|---|---|
| r1 | −162.844 | | | | | | |
| | | d1 | 1.000 | N1 | 1.80100 | ν1 | 46.54 |
| r2 | 18.910 | | | | | | |
| | | d2 | 1.131 | | | | |
| r3 | 21.538 | | | | | | |
| | | d3 | 5.000 | N2 | 1.80750 | ν2 | 35.43 |
| r4 | 85.222 | | | | | | |
| | | d4 | 19.040 to 13.941 to 4.052 | | | | |
| r5 | 8.644 | | | | | | |
| | | d5 | 5.000 | N3 | 1.48749 | ν3 | 70.44 |
| r6 | −26.098 | | | | | | |
| | | d6 | 0.627 | | | | |
| r7* | −12.255 | | | | | | |
| | | d7 | 2.800 | N4 | 1.75690 | ν4 | 31.79 |
| r8* | −23.577 | | | | | | |
| | | d8 | 9.725 to 3.962 to 3.600 | | | | |
| r9* | −19.973 | | | | | | |
| | | d9 | 3.350 | N5 | 1.58340 | ν5 | 30.23 |
| r10 | −15.799 | | | | | | |
| | | d10 | 4.600 | | | | |

TABLE 4-continued (4th Embodiment)

| r11 | -10.000 | | | | | | |
|---|---|---|---|---|---|---|---|
| | | d11 | 1.000 | N6 | 1.61800 | ν6 | 63.39 |
| r12 | -50.713 | | | | | | |

$\Sigma d = 53.274$ to $42.412$ to $32.160$

Aspherical Coefficients

| r7 | :ε = 1.0000 | r8 | :ε = 1.0000 |
|---|---|---|---|
| | A4 = 0.41138 × 10⁻³ | | A4 = 0.51772 × 10⁻³ |
| | A6 = 0.16208 × 10⁻⁵ | | A6 = 0.41869 × 10⁻⁵ |
| | A8 = -0.35351 × 10⁻⁷ | | A8 = 0.30548 × 10⁻⁷ |
| | A10 = -0.32191 × 10⁻⁹ | | A10 = 0.14342 × 10⁻⁹ |
| r9 | :ε = 1.0000 | | |
| | A3 = 0.55964 × 10⁻⁴ | | |
| | A4 = 0.57015 × 10⁻⁴ | | |
| | A5 = -0.16593 × 10⁻⁵ | | |
| | A6 = -0.31963 × 10⁻⁶ | | |
| | A7 = -0.34509 × 10⁻⁷ | | |
| | A8 = 0.40595 × 10⁻⁷ | | |
| | A9 = -0.21819 × 10⁻⁸ | | |
| | A10 = -0.99837 × 10⁻¹⁰ | | |
| | A11 = -0.15082 × 10⁻¹¹ | | |
| | A12 = 0.79424 × 10⁻¹² | | |

| r7 | $\varepsilon = 1.0000$ | r8 | $\varepsilon = 1.0000$ |
|---|---|---|---|
| | $A4 = 0.41138 \times 10^{-3}$ | | $A4 = 0.51772 \times 10^{-3}$ |
| | $A6 = 0.16208 \times 10^{-5}$ | | $A6 = 0.41869 \times 10^{-5}$ |
| | $A8 = -0.35351 \times 10^{-7}$ | | $A8 = 0.30548 \times 10^{-7}$ |
| | $A10 = -0.32191 \times 10^{-9}$ | | $A10 = 0.14342 \times 10^{-9}$ |
| r9 | $\varepsilon = 1.0000$ | | |
| | $A3 = 0.55964 \times 10^{-4}$ | | |
| | $A4 = 0.57015 \times 10^{-4}$ | | |
| | $A5 = -0.16593 \times 10^{-5}$ | | |
| | $A6 = -0.31963 \times 10^{-6}$ | | |
| | $A7 = -0.34509 \times 10^{-7}$ | | |
| | $A8 = 0.40595 \times 10^{-7}$ | | |
| | $A9 = -0.21819 \times 10^{-8}$ | | |
| | $A10 = -0.99837 \times 10^{-10}$ | | |
| | $A11 = -0.15082 \times 10^{-11}$ | | |
| | $A12 = 0.79424 \times 10^{-12}$ | | |

TABLE 5

| Conditions | 1st embodiment | 2nd embodiment | 3rd embodiment | 4th embodiment |
|---|---|---|---|---|
| $0.08 < \dfrac{B_f}{\Delta t} < 3$ | 0.203 | 0.912 | 0.956 | 0.219 |
| $0.3 < \dfrac{f_w}{f_1} < 2.5$ | — | 0.73 | — | — |
| $2 < \dfrac{f_t}{|f_4|} < 20$ | — | 9.48 | — | — |
| $0.5 < \dfrac{f_w}{f_2} < 3$ | — | — | — | 1.37 |
| $0.3 < \dfrac{f_t}{|f_1|} < 5$ | — | — | — | 1.40 |

TABLE 6

| | | 2nd embodiment (positive, negative positive, negative) | |
|---|---|---|---|
| | | W | T |
| Spherical aberration | ∞ | 0.81 | 6.26 |
| | Gr1 | 0.82 | 8.2 |
| | Gr4 | 0.84 | 9.9 |
| Coma | ∞ | -0.60 | -0.89 |
| | Gr1 | -0.47 | 0.69 |
| | Gr4 | -0.89 | -1.74 |
| Field curvature | ∞ | 0.02 | 0.14 |
| | Gr1 | -0.11 | -0.58 |
| | Gr4 | 0.38 | 0.14 |

TABLE 7

| | | 3rd embodiment (negative, positive) | |
|---|---|---|---|
| | | W | T |
| Spherical aberration | ∞ | 3.57 | 8.01 |
| | Gr1 | 3.68 | 12.8 |
| | Gr2 | 4.24 | 12.3 |
| Coma | ∞ | 0.57 | -0.32 |
| | Gr1 | 0.56 | -0.07 |
| | Gr2 | 0.54 | 0.38 |
| Field curvature | ∞ | 0.18 | -0.05 |
| | Gr1 | 0.17 | -0.04 |
| | Gr2 | 0.15 | -0.01 |

TABLE 8

| | | 4th embodiment (negative, positive, negative) | |
|---|---|---|---|
| | | W | T |
| Spherical aberration | ∞ | 0.83 | -34.5 |
| | Gr1 | 1.03 | -23.8 |
| | Gr2 | 1.00 | -38.3 |
| Coma | ∞ | 0.16 | -0.71 |
| | Gr1 | 0.16 | -0.165 |
| | Gr2 | 0.13 | -1.53 |
| Field curvature | ∞ | 0.13 | 0.01 |
| | Gr1 | 0.14 | 0.04 |
| | Gr2 | 0.16 | -0.01 |

What is claimed is:

1. A zoom lens system consisting of, from an object side:
a first lens unit having a positive refractive power;
a second lens unit having a negative refractive power and means for focusing in a focal length range from a shortest focal length condition to a middle focal length condition, wherein focusing is performed by moving only the positive lens unit, and focusing in a focal length range from the middle focal length condition to a longest focal length condition, wherein focusing is performed by moving only the negative lens unit.

2. A zoom lens system including, from an object side;
a positive lens unit; and
a negative lens unit,
wherein focusing, from an infinite subject distance focusing condition to a minimum subject distance focusing condition in a focal length range from a shortest focal length condition to a middle focal length condition, is performed by moving the positive lens unit, and wherein focusing, from an infinite subject distance focusing condition to a minimum subject distance focusing condition in a focal length range from the middle focal length condition to a longest focal length condition, is performed by moving the negative lens unit, and wherein the following condition is fulfilled:

$$0.08 < \frac{B_f}{\Delta t} < 3$$

where $Bf$ is a distance from a rear surface of the zoom lens system to a film at the shortest focal length condition and $\Delta t$ is a diagonal length of the film.

3. A zoom lens system consisting of, from an object side:
a first lens unit having a positive refractive power;

a second lens unit having a negative refractive power;

wherein focusing, from an infinite subject distance focusing condition to a minimum subject distance focusing condition in a focal length range from a shortest focal length condition to a middle focal length condition, is performed by moving the positive lens unit, and wherein focusing, from an infinite subject distance focusing condition to a minimum subject distance focusing condition in a focal length range from the middle focal length condition to a longest focal length condition, is performed by moving the negative lens unit, and wherein the following condition is fulfilled:

$$0.08 < \frac{B_f}{\Delta t} < 3$$

where $Bf$ is a distance from a rear surface of the zoom lens system to a film at the shortest focal length condition and $\Delta t$ is a diagonal length of the film.

4. A zoom lens system as claimed in claim 3 wherein the focusing movement of the positive lens is toward the object side, while the focusing movement of the negative lens unit is towards an image side.

* * * * *